US008805987B1

(12) United States Patent
Kirkham et al.

(10) Patent No.: US 8,805,987 B1
(45) Date of Patent: Aug. 12, 2014

(54) ENSURING A COOKIE-LESS NAMESPACE

(75) Inventors: Stephen Kirkham, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 13/306,789

(22) Filed: Nov. 29, 2011

(51) Int. Cl.
*G06F 15/173* (2006.01)

(52) U.S. Cl.
USPC .......................................... 709/223; 709/203

(58) Field of Classification Search
USPC ................................................. 709/223, 203
See application file for complete search history.

(56) References Cited

U.S. PATENT DOCUMENTS

| | | | | |
|---|---|---|---|---|
| 7,010,582 | B1* | 3/2006 | Cheng et al. | 709/219 |
| 7,028,072 | B1* | 4/2006 | Kliger et al. | 709/203 |
| 8,166,406 | B1* | 4/2012 | Goldfeder et al. | 715/745 |
| 2004/0205149 | A1* | 10/2004 | Dillon et al. | 709/217 |
| 2005/0015429 | A1* | 1/2005 | Ashley et al. | 709/200 |
| 2005/0154887 | A1* | 7/2005 | Birk et al. | 713/168 |
| 2005/0166233 | A1* | 7/2005 | Beyda et al. | 725/46 |
| 2007/0157289 | A1* | 7/2007 | Newton et al. | 726/2 |
| 2007/0244964 | A1* | 10/2007 | Challenger et al. | 709/203 |
| 2008/0027824 | A1* | 1/2008 | Callaghan et al. | 705/26 |
| 2009/0024737 | A1* | 1/2009 | Goldspink et al. | 709/224 |
| 2009/0106349 | A1* | 4/2009 | Harris | 709/203 |
| 2009/0228357 | A1* | 9/2009 | Turakhia | 705/14 |
| 2011/0078333 | A1* | 3/2011 | Jakubowski | 709/248 |
| 2011/0214163 | A1* | 9/2011 | Smith et al. | 726/4 |
| 2011/0289138 | A1* | 11/2011 | Turakhia | 709/203 |
| 2011/0289582 | A1* | 11/2011 | Kejriwal et al. | 726/22 |
| 2012/0016929 | A1* | 1/2012 | Travieso et al. | 709/203 |
| 2012/0159307 | A1* | 6/2012 | Chung et al. | 715/234 |
| 2012/0239809 | A1* | 9/2012 | Mazumdar et al. | 709/224 |

OTHER PUBLICATIONS

"Learn More about the Public Suffix List," Public Suffix List, Mozilla Foundation, Nov. 2007, http://publicsuffix.org/learn/.
"Public Suffix List," Mozilla Foundation, Nov. 2007, http://publicsuffix.org/.
"View the Public Suffix List," Public Suffix List, Mozilla Foundation, Nov. 2007, http://publicsuffix.org/list/.
"HTTP State Management Mechanism," Network Working Group, Request for Comments: 2109, Feb. 1997, http://ietf.org/rfc/rfc2109.txt.
Original Computer Software Code, Mozilla and Jo Hermans, 2007, http://mxr.mozilla.org/Mozilla-central/source/network/dns/effective_tld_names.dat?raw=1.

* cited by examiner

*Primary Examiner* — Waseem Ashraf
(74) *Attorney, Agent, or Firm* — Foley & Lardner LLP; John D. Lanza

(57) ABSTRACT

Methods, systems, and apparatuses, including computer programs encoded on computer-readable media, for receiving a request to set a first cookie from a first server. A first domain name associated with the first cookie is determined. The first domain name includes a first top-level domain and a first sub-domain. Based in part on the first top-level domain name, it is determined if a cookie is allowed to be set.

18 Claims, 7 Drawing Sheets

ENSURING A COOKIE-LESS NAMESPACE

BACKGROUND

Cookies are used by servers throughout the world wide web to store information on a client computer. The client computer sends back the information in the cookie in requests to the server. As cookies can be used to store state information and other data, some web services require that a client in communication with the web server allow cookies. Using these cookies, a user can be tracked across various sites that refer to a particular technology. Accordingly, cookies may raise privacy concerns.

SUMMARY

In general, one aspect of the subject matter described in this specification can be embodied in methods for receiving a request to set a first cookie from a first server. A first domain name associated with the first cookie is determined. The first domain name includes a first top-level domain and a first sub-domain. Based in part on the first top-level domain name, it is determined if a cookie is allowed to be set. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Cookies can be used to store state information for web requests. When a user requests a resource, such as a web page, image, script, etc., from a web server, any cookie whose domain value matches the server's name is sent to the server. The server, therefore, is able to receive the cookie's data as the user requests various resources from the server. Based upon the use of cookies, there are a few common concerns. First, cookies can be used to track individuals across a large number of sites if each of the sites includes a request to a resource located on servers that have a matching portion of their domain names. This can occur, for example, if each site incorporates a popular piece of technology. Second, cookies can be used to identify a user and allow the user access to resources that are specific to that user. In this case, if a user's cookie is stolen, it could allow a third party to impersonate the user and potentially gain access to the user's data.

As the use of cookies is widespread through the web, one current solution regarding the above concerns is to use a dedicated domain name or specific hostname to serve cookie-less resources. For example, a company could use its main website, company.com, to serve resources that can include cookies. The company could then use a second domain name, such as company-nocookies.com, to serve resources that would not set cookies. The second domain name could be used to serve resources that are incorporated into a large number of third-party websites or are resources specific to a particular user. If no cookies were set from the second domain, then users would not be tracked nor could an impersonator gain access to user-specific resources. As there is no technical restriction to using cookies on the second domain, the company would have to ensure that its resources never set cookies. Alternatively, in accordance with an illustrate implementation, a cookie-less namespace could be used.

A cookie-less namespace is a namespace that prohibits the setting of cookies associated with the top-level domain or any domain name incorporating the top-level domain. For example, a top-level domain ".anon" could be used to signify that no domain name ending in .anon would set a cookie. There are several ways that this could be achieved. Before discussing various implementations, how cookies are currently set is discussed.

Figure 1:
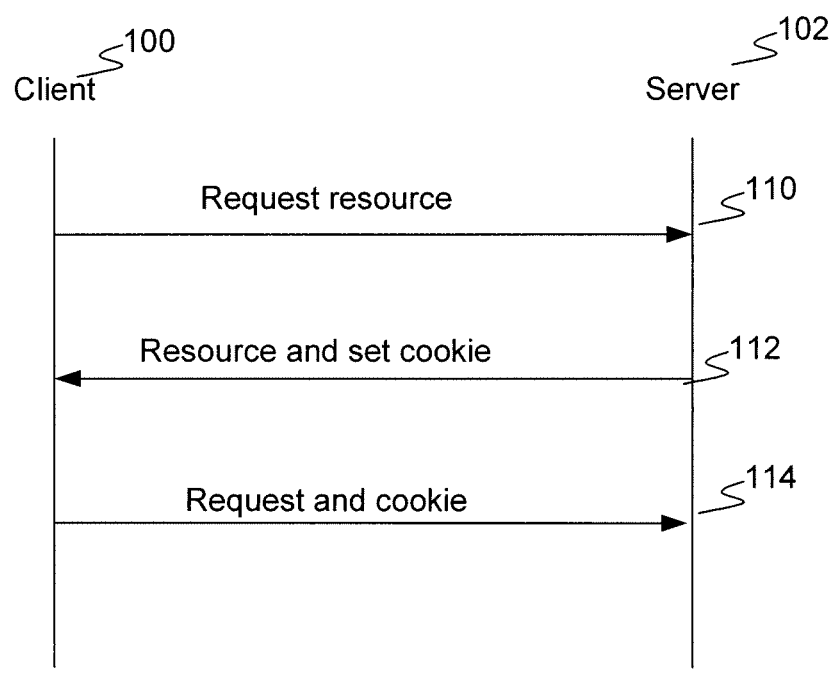
FIG. 1 is a sequence diagram for setting a cookie.

FIG. 1 is a sequence diagram for setting a cookie. A client 100, such as a web browser, requests 110 a resource from a server 102. For example, a user can input the uniform resource locator (URL) www.company.com into a browser. The user's browser could then request the root URL from the server associated with the domain name www.company.com. In response to the request 110, the server 102 responds 112 with the resource and also includes a request to set a cookie on the client 100. Upon receipt, the client 100 will store the cookie. Cookies can be associated with an age, which defines the lifetime of the cookie. Once a cookie is expired it can be removed from the client 100. After the cookie is stored, a future request 114 for resources located on the server 102 will include the cookie.

Figure 2:
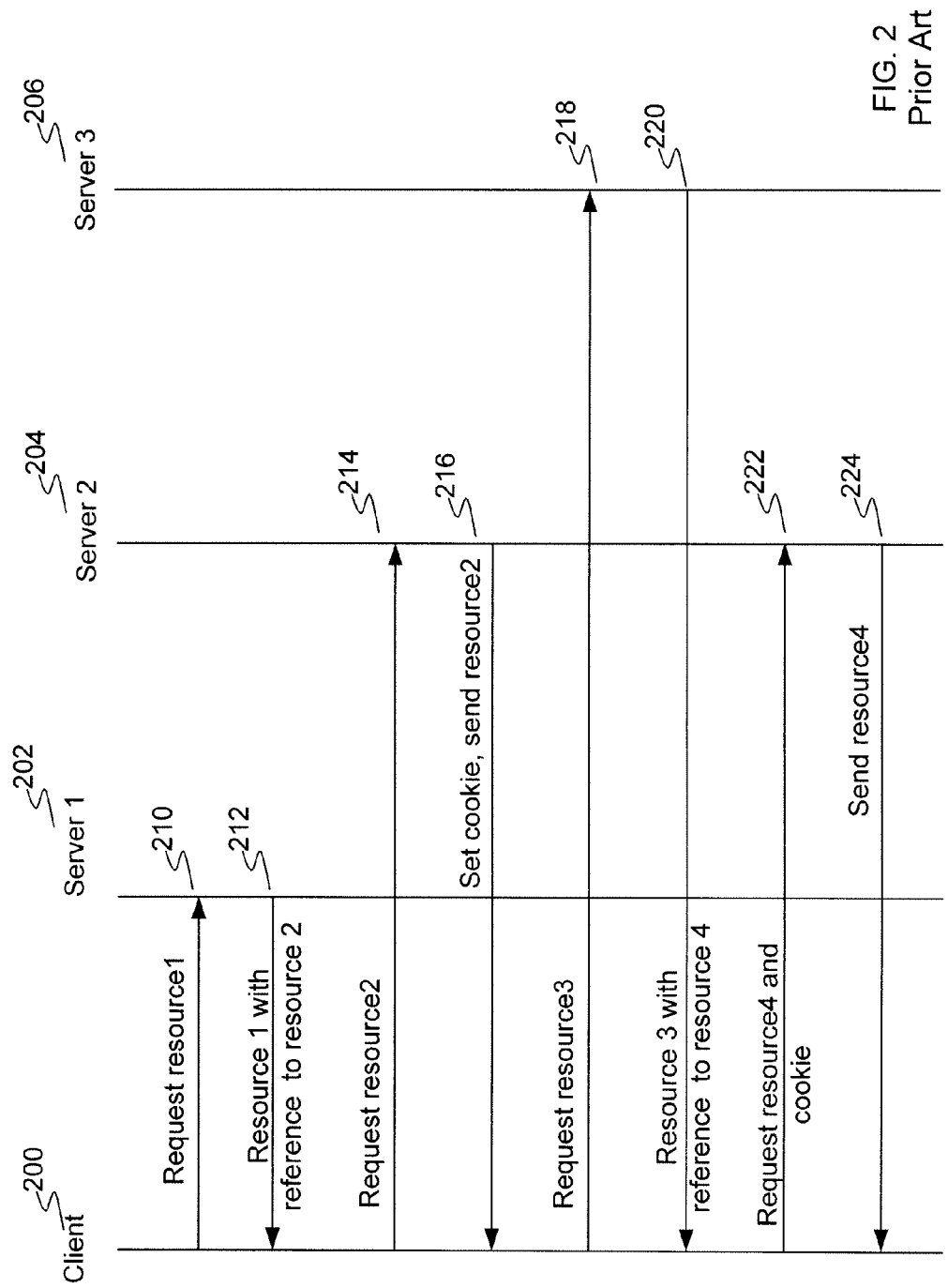
FIG. 2 is a sequence diagram for using a cookie across different servers.

Resources requested from a server can include links or references to additional resources. These additional resources can be located on a server that is different than the server that hosts the originally requested resource. A web browser can automatically request these additional resources as part of loading/rendering the originally requested resource. The requests for the additional resources can set cookies. FIG. 2 is a sequence diagram for using a cookie across different servers. A client 200 can request a first resource 210 from a first server 202. For example, a user can request the resource associated with the domain name www.company.com. The first server 202 can respond with the first resource. In addition, the first server 202 could also set a cookie. The first resource can include a reference to a second resource that is located at a second server 204. Upon loading the first resource, the second resource can be requested 214. The second server 204 can respond 216 by sending the second resource and setting a cookie. Later the client 200 can request 218 another resource from a third server 206. The third server 206 can respond 220 with the requested resource. This resource can include a reference to a resource that is located on the second server 204. Upon requesting this resource 222, the cookie that was previously set based upon the second resource, is sent to the second server. In response, the second server responds with the requested resource 224. Accordingly, the second server 204 has received a cookie from the client 200 based upon the client requesting two resources on different servers 202 and 206.

Figure 3:
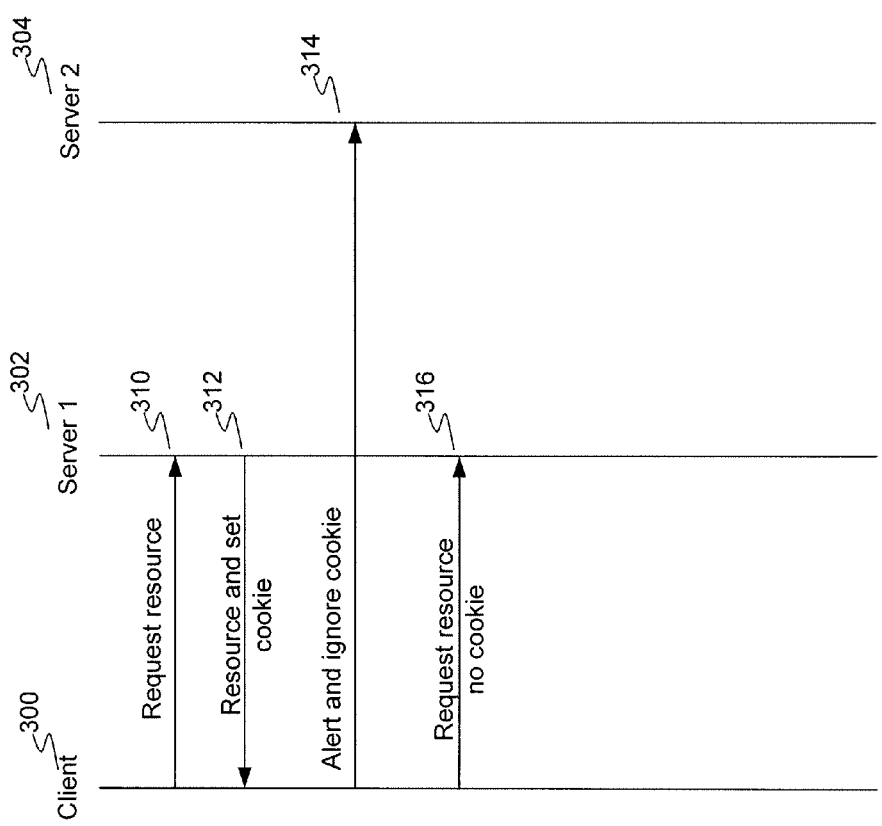
FIG. 3 is a sequence diagram for ignoring a cookie from a cookie-less namespace in accordance with an illustrative implementation.

As described above, there are various ways a cookie-less namespace could be implemented. In one implementation, a browser can verify that a request to set a cookie is not originating from a cookie-less namespace. FIG. 3 is a sequence diagram for ignoring a cookie from a cookie-less namespace in accordance with an illustrative implementation. A client 300 can request a resource 310 from a first server 302. The first server 302 responds with the resource and a request to set a cookie on the client 312. Before storing the cookie, the client 300 can determine if the set cookie request is valid. In one implementation, the client 300 can include a browser that verifies that a set cookie request is valid. To verify that the set cookie request is valid, the browser can determine if the set cookie request is from a cookie-less namespace.

In one implementation, the browser can have a hard coded list of cookie-less namespaces, for example ".anon", ".nocookies.com", ".nocookies.*", where * denotes any suitable domain. The namespaces can be a top level domain, such as ".anon"; a domain ".nocookies.com"; a fully qualified or domain name "www.nocookies.com". In addition, the namespace can be defined using wildcards. For example, ".nocookies.*" can match any domain name that includes a "nocookies" sub-domain. Examples of domain names that match this wildcard include www.nocookies.com; nocookies.company.com; www.nocookies.net, etc. In the examples that follow, the ".anon" top-level domain is considered a cookie-less namespace. In another implementation, the browser can request a list of cookie-less namespaces from another server. The browser can also combine these two approaches and have a hard coded list of cookie-less namespaces that can be supplemented/modified by data from a server that maintains a list of cookie-less namespaces. In one implementation, data from the public suffix list can be used to define the cookie-less namespaces.

As each cookie is associated with a domain, the domain is used to determine if the domain matches any of the cookie-less namespaces. For example, a cookie request associated with the domain ".company.anon" would not be valid as the domain ends with the cookie-less top-level domain ".anon". Matching of the domain name to cookie-less namespaces can include matching sub-domains. For example, a domain ".nocookies.company.com" can match a ".nocookies.*" cookie-less namespace. As another example a domain name "www.nocookies.com" can match a ".nocookies.com" cookie-less namespace. Once a domain name matches a cookie-less namespace, any set cookie request from the domain name is not set.

Continuing with FIG. 3, when a set cookie request is determined to be from the first server 302 whose domain name matches a cookie-less namespace, the client 300 does not set the cookie 314. As the cookie was not set, future requests 316 for resources on the server do not include the cookie. In addition to not setting the cookie, the client 300 can respond in a number of additional ways. In one implementation, the client can send an alert 314 to a second server 304. The alert can include information such as identifying information of the first server 302, the requested resource, and information regarding the cookie. This information can be used to notify the first server 302 that it is improperly requesting a cookie to be set. As another example, this information can also be made publicly accessible. The client 400 can also log an invalid cookie request and/or provide a visual indication/alert to the user indicating that a cookie was ignored as being associated with a cookie-less namespace.

In other implementations, the client 300 can include other software, programs, components, etc., that can verify a set cookie request. For example, a browser plugin can be used to verify set cookie requests. As another example, software independent of the browser could monitor network traffic for set cookie requests. Each set cookie request could be verified. A cookie request from a cookie-less namespace could be automatically removed from the network data stream before reaching the browser. In this implementation, the browser would never see the request to set the cookie.

In yet another implementation, network traffic can be monitored for set cookie requests. For example, the client 300 sends a request to the first server 302 through a network. Likely, the request is sent to the first server 302 using various network routers, bridges, switches, etc. Any one or more of these devices can be used to examine network traffic for set cookie requests. Once found, the device can determine a domain name associated with the set cookie request and verify if the cookie request is valid. Upon determining that a set cookie request is associated with a cookie-less domain space, the device can issue an alert. The alert can be sent a remote server that aggregates the alerts. In another implementation, the device can modify the network data traffic. For example, the set cookie request could be removed or data could be added to alert the user of the invalid request.

Figure 4:
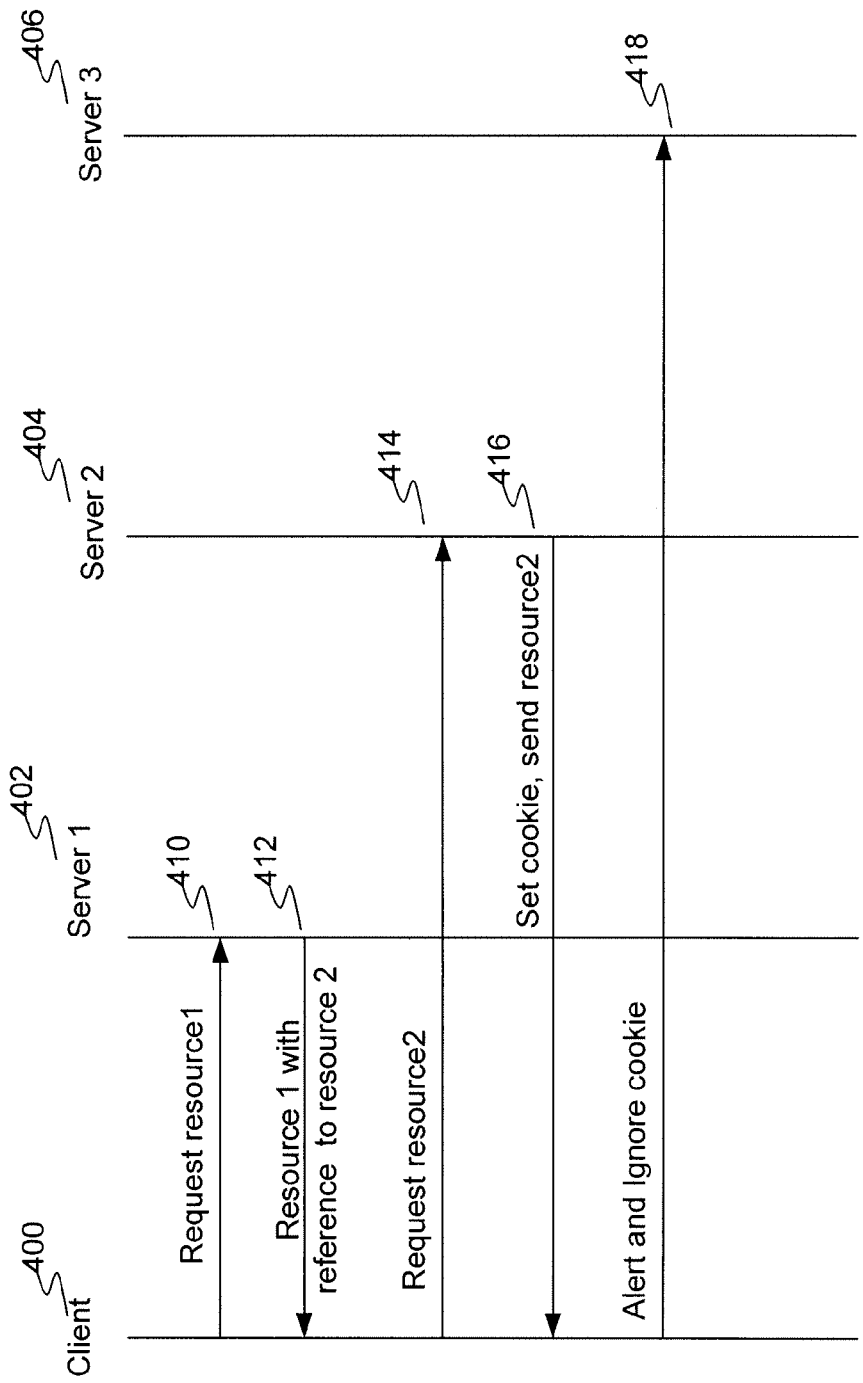
FIG. 4 is a sequence diagram for ignoring a cookie based upon an initial request to a cookie-less namespace in accordance with an illustrative implementation.

A resource from a cookie-less domain might not set a cookie; however, the resource can include a reference to another resource that does set a cookie. In this example, a user could be tracked across the cookie-less domain. In one implementation, all cookie requests are ignored if the cookie request originated from a resource requested from a cookie-less domain. FIG. 4 is a sequence diagram for ignoring a cookie based upon an initial request to a cookie-less namespace in accordance with an illustrative implementation. A client 400 can request 410 a resource from a first server 402 associated with a cookie-less namespace. The first server 402 can respond with the requested resource 412. The requested resource can include a reference to another resource located on a second server 404.

The second server 404 is not associated with a cookie-less namespace and can normally set cookies on the client 400. In this illustrated example, however, the client requests 414 the second resource based upon the request for the first resource from the first server 402 that is associated with a cookie-less namespace. In response, the second server 404 responds with the requested resource and a set cookie request 416. The client verifies if this set cookie request is valid. First, the client can verify if the second server 404 is associated with a cookie-less namespace. In the example illustrated in FIG. 4, the second server 404 is not associated with a cookie-less namespace. The set cookie request, however, is not valid since the request for the second resource originated from a resource located on a server associated with a cookie-less namespace. In one implementation, the second server 404 can determine if a set cookie request should be sent back to the client 400. For example, the second server 404 can use data such as, but not limited to, header data sent to the second server 404 from the client 400 in the request 414. As a specific example, the second server 404 can use the referrer data to determine if the referrer is associated with a cookie-less namespace. The set cookie request can not be sent if the referrer is associated with a cookie-less namespace.

To identify the invalid set cookie request, the client 400 can determine the domain names from the resources that caused the second resource to be requested. For example, a resource located on the first server 402 can include a reference to an image located on the second server 404. When verifying a set cookie request from the second server 404, the domain name of the first server 402 can be checked, since the image request was based upon a resource retrieved from the first server 402. In this example, checking the domain name of the first server invalidates the set cookie request. Based upon the invalid request, the client 400 can ignore the cookie.

Figure 5:
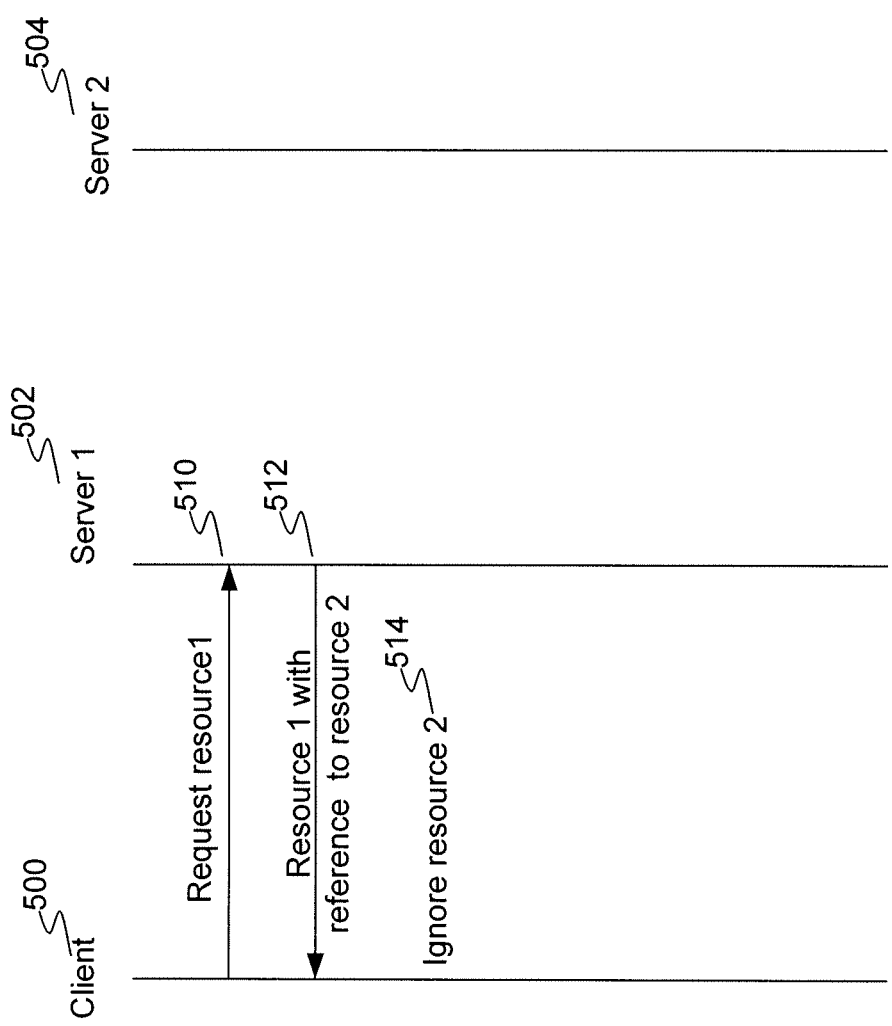
FIG. 5 is a sequence diagram for ignoring a resource request based upon an initial request to a cookie-less namespace in accordance with an illustrative implementation.

In another implementation, to avoid tracking a user using a cookie across a cookie-less namespace, references to resources that are located on different servers can be ignored. FIG. 5 is a sequence diagram for ignoring a resource request based upon an initial request to a cookie-less namespace in accordance with an illustrative implementation. A client 500 can request a resource 510 from a first server 502. The first server's domain name is within a cookie-less namespace. The first server 502 can respond with the first resource 512. The first resource can include a reference to a second resource that is located on a second server 504. As the first resource is located on a server within a cookie-less namespace, the client 500 can ignore the reference to the second resource 514 since it is located on a different server. In one implementation, the servers' domain names can be compared to determine if they are different. In one implementation, if the domain names have the same cookie-less top level domain name, the second resource can be retrieved. In another implementation, the client 500 can determine if the second resource is located on a server that is within a cookie-less namespace. If the second resource is also within a cookie-less namespace, the second resource can be retrieved, even if the second server's domain name is different than the domain name of the first server 502.

Figure 6:
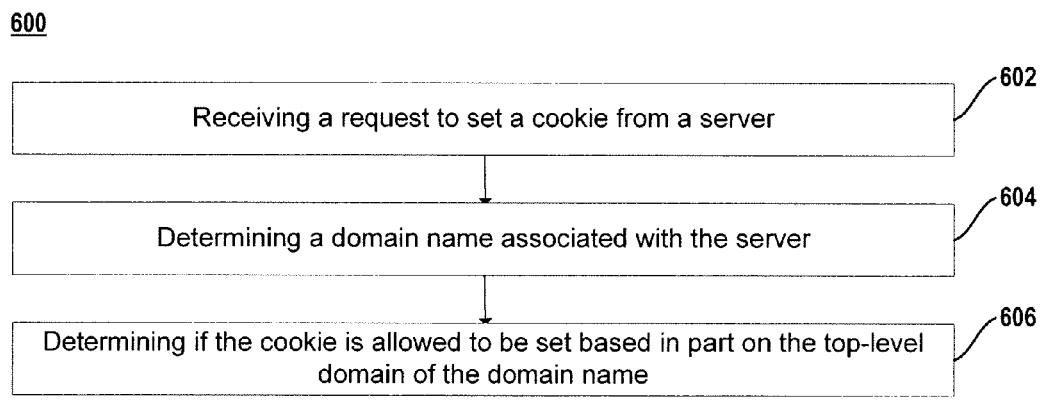
FIG. 6 is a flow diagram of a process for determining if a cookie is allowed to be set in accordance with an illustrative implementation.

FIG. 6 is a flow diagram of a process for determining if a cookie is allowed to be set in accordance with an illustrative implementation. The process 600 can be implemented on a computing device. In one implementation, the process 600 is encoded on a computer-readable medium that contains instructions that, when executed by a computing device, cause the computing device to perform operations of process 600.

A request to set a cookie from a server is received (602). In one implementation, the request to set the cookie can be received by a web browser in response to a request for a resource located on the server. In another implementation, a device independent from a client can receive the set cookie request. For example, a router that is involved in routing the set cookie request back to the client can examine the network data for set cookie requests. Once a set cookie request is received, a domain name associated with the server is determined (604). From the domain name, a top-level domain name and a sub-domain name is determined. Based upon at least the top-level domain, it is determined if the cookie is allowed to be set (606). For example, a set cookie request is not allowed if the top-level domain matches a known cookie-less top level domain. In another implementation, the entire name of the server can be used to determine if a cookie is allowed to be set. For example, a domain matching ".setnocookie.company.com" can be determined to be a cookie-less namespace. Accordingly, any set cookie requests associated with a domain that matches ".setnocookie.company.com" can be ignored. In yet another implementation, the sub-domain can be used to determine if a cookie is allowed. As an example, if the sub-domain includes a ".setnocookie." portion, the cookie can be ignored.

Figure 7:
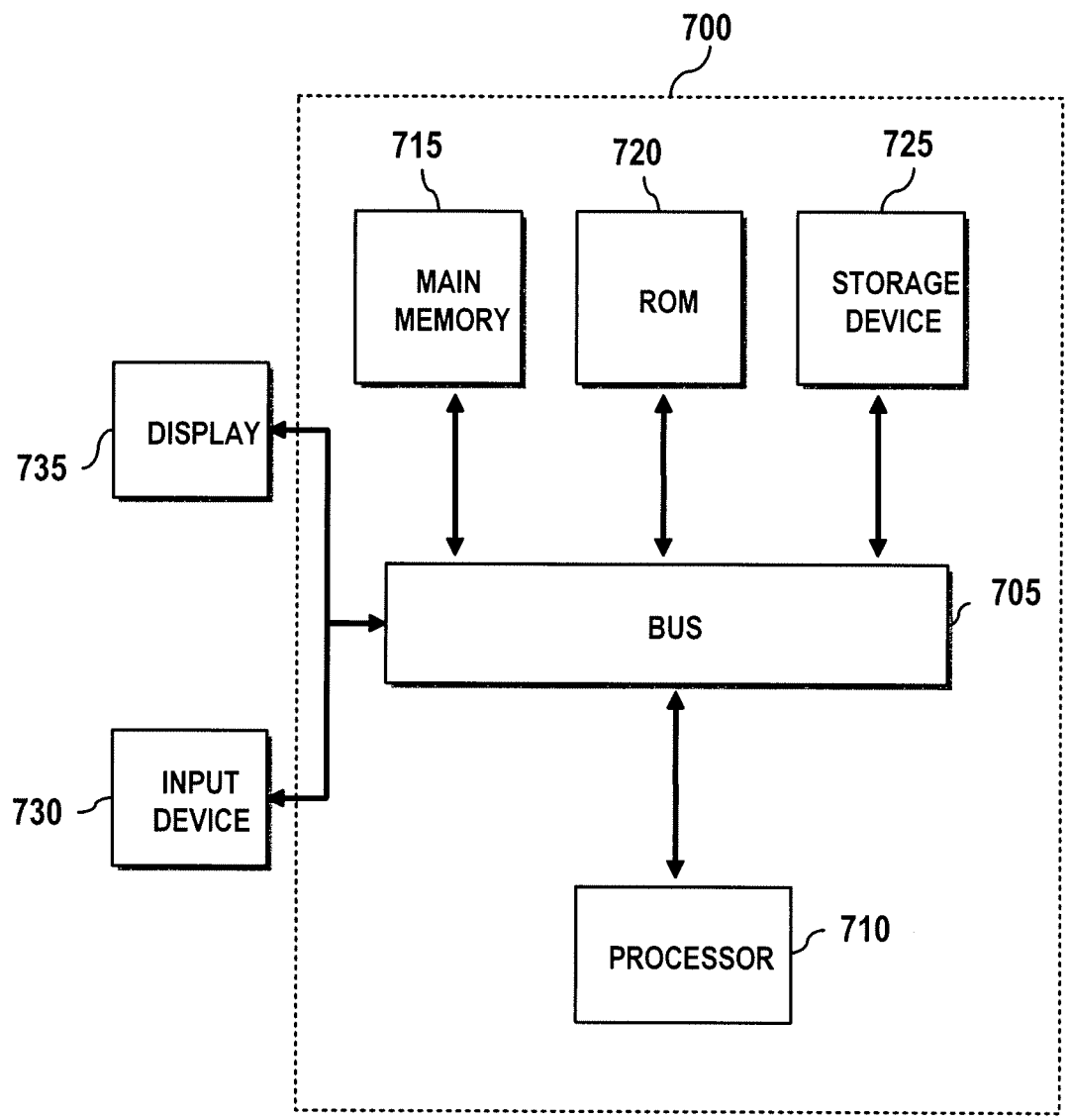
FIG. 7 is a block diagram of a computer system in accordance with an illustrative implementation.

FIG. 7 is a block diagram of a computer system in accordance with an illustrative implementation. The computer system or computing device 700 can be used to implement a client, servers, networking components, cloud computing resources, etc. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 710 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. In another implementation, the input device 730 has a touch screen display 735. The input device 730 can include a cursor control, such as a mouse, a trackball, or cursor direction keys, for communicating direction information and command selections to the processor 710 and for controlling cursor movement on the display 735.

According to various implementations, the processes described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to effect illustrative implementations. Thus, implementations are not limited to any specific combination of hardware circuitry and software.

Although an example computing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more non-transitory computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
requesting a first resource from a first server;
in response to the request for the first resource from the first server, receiving the first resource from the first server, the first resource including a reference to a second resource located at a second server different from the first server;
requesting the second resource from the second server;
in response to the request for the second resource, receiving the second resource and a request to set a cookie from the second server;
upon receiving the request to set the cookie from the second server, determining a first domain associated with the first server, the first domain including a first top level domain;
determining that the first top level domain matches a predetermined top level domain from one or more predetermined top level domains not allowing for cookies;
determining that the first domain prohibits cookies based on the first top level domain matching the predetermined top level domain from the one or more predetermined top level domains not allowing cookies; and
determining not to set the cookie based on the determination that the second resource request originated from a resource located on a server associated with the first domain that prohibits cookies.

2. The method of claim 1, further comprising receiving the one or more predetermined top level domains.

3. The method of claim 1, further comprising:
receiving a request to set a second cookie from the first server, wherein the request to set the second cookie is received in response to the request for the first resource.

4. The method of claim 1, further comprising
determining a second domain associated with the cookie, the second domain including a second top level domain different from the first top level domain, the second top level domain not matching any of the one or more predetermined top level domains not allowing for cookies;
determining that the second domain allows for cookies based on the second top level domain not matching any of the one or more predetermined top level domains not allowing cookies.

5. The method of claim 4, further comprising receiving the one or more predetermined top level domains.

6. The method of claim 5, wherein the cookie is not set.

7. The method of claim 3, further comprising:
determining whether to request the second resource based in part on the first domain.

8. The method of claim 7, further comprising requesting the second resource if a second top-level domain associated with the second domain equals the first top-level domain associated with the first domain.

9. The method of claim 7, further comprising receiving one or more predetermined top level domains;
wherein the second resource is requested if the second domain name does not match any of the domains in the one or more predetermined top level domains.

10. The method of claim 1, further comprising providing an indication that the cookie was not set.

11. The method of claim 1, further comprising determining if the cookie is allowed to be set based on the first domain.

12. A computer-readable storage device having instructions stored thereon, the instructions comprising:
instructions to request a first resource from a first server;
instructions to receive the first resource from the first server, in response to the request for the first resource, the first resource including a reference to a second resource located at a second server different from the first server;
instructions to request the second resource from the second server;
instructions to receive the second resource, in response to the request for the second resource, and a request to set a cookie from the second server;
instructions to determine a first domain associated with the first server, upon receiving the request to set the cookie, wherein the first domain including a first top level domain;
instructions to determine that the first top level domain matches a predetermined top level domain from one or more predetermined top level domains not allowing for cookies;
instructions to determine that the first domain prohibits cookies based on the first top level domain matching the predetermined top level domain from the one or more predetermined top level domains not allowing cookies; and
instructions to determine not to set the cookie based on the determination that the second resource request originated from a resource located on a server associated with the first domain that prohibits cookies.

13. The computer-readable storage device of claim 12, further comprising:
instructions to receive the one or more predetermined top level domains.

14. The computer-readable storage device of claim 12, further comprising:
instructions to determine whether to request the second resource based in part on the first top-level domain name associated with the first domain.

15. The method of claim 1, further comprising:
generating an alert including second server identifying information, second resource information, cookie information; and
transmitting the alert to a third server for notifying the second server of invalid cookie request.

16. The method of claim 1, further comprising:
generating an alert including second server identifying information, second resource information, cookie information; and
transmitting the alert to a third server for notifying the second server of invalid cookie request.

17. The computer-readable storage device of claim 12, further comprising:
instructions to generate an alert including second server identifying information, second resource information, cookie information; and
instructions to transmit the alert to a third server for notifying the second server of invalid cookie request.

18. A system comprising:
one or more data processors; and
one or more storage devices storing instructions that, when executed by the one or more data processors, cause the one or more data processors to perform operations comprising:
requesting a first resource from a first server;
in response to the request for the first resource, receiving the first resource from the first server, the first resource including a reference to a second resource located at a second server different from the first server;

requesting the second resource from the second server;

in response to the request for the second resource, receiving the second resource and a request to set a cookie from the second server;

upon receiving the request to set the cookie, determining a first domain associated with the first server, the first domain including a first top level domain;

determining that the first top level domain matches a predetermined top level domain from one or more predetermined top level domains not allowing for cookies;

determining that the first domain prohibits cookies based on the first top level domain matching the predetermined top level domain from the one or more predetermined top level domains not allowing cookies; and determining not to set the cookie based on the determination that the second resource request originated from a resource located on a server associated with the first domain that prohibits cookies.

\* \* \* \* \*